United States Patent Office 3,630,973
Patented Dec. 28, 1971

3,630,973
LOW VISCOSITY POLYOL BLENDS AND RIGID POLYURETHANE FOAMS PREPARED THEREFROM
Alan E. Ardis, North Haven, Conn., and Milton Lapkin, Barrington, R.I., assignors to Olin Corporation, New Haven, Conn.
No Drawing. Continuation-in-part of abandoned application Ser. No. 633,726, Apr. 26, 1967. This application Mar. 24, 1970, Ser. No. 22,368
Int. Cl. C08g 22/06, 22/46, 22/48
U.S. Cl. 260—2.5 AS                   10 Claims

ABSTRACT OF THE DISCLOSURE

The addition of small amounts of low-molecular-weight glycols to highly viscous polyether polyols provides polyol blends having reduced viscosities and improved handling characteristics. Polyurethane foams having desirable physical properties can be prepared from these polyol blends. Such polyurethane foams are of utility in numerous applications including insulation, cushioning and the like.

---

This application is a continuation-in-part of co-pending U.S. application Ser. No. 633,726, filed Apr. 26, 1967, now abandoned.

The invention relates to polyol blends based on highly viscous polyether polyols and to polyurethanes prepared therefrom.

The polyurethanes are an extremely useful group of plastics, having applications as rigid and flexible foams, as adhesives, coatings, elastomers, potting resins, in textiles etc. Polyurethane foams have found wide and varied uses in industry. For example, rigid foams are used as insulators, and semi-rigid and flexible foams are employed in cushioning and packaging applications.

The preparation of polyurethane foams by the reaction of a polyether polyol containing at least two active hydrogen-containing groups as determined by the Zerewitinoff method with an organic polyisocyanate in the presence of a foaming agent, a surfactant and a reaction catalyst is well known.

It is frequently desirable to employ highly viscous polyether polyols as the active hydrogen-containing polyether in the previously-described reaction, particularly in the preparation of rigid polyurethane foams. Thus, highly viscous polyether polyols, prepared by oxyalkylating polyols with 4,4,4-trichloro-1,2-epoxybutane, are particularly valuable in the preparation of flame-retardant polyurethane foams. Furthermore, polyurethane foams prepared by using such polyether polyols generally have improved resistance to charring and increased dimensional stability.

However, due to their high viscosities, i.e., over 215,000 cps. at 25° C., such polyether polyols often present serious handling and formulation problems when utilized in the preparation of polyurethane foams. For example, special equipment such as heated feed lines and special stirrers are required. Furthermore, it is known that the use of heat to reduce the viscosity is not a satisfactory solution since the added heat increases the temperature of the resulting polyurethane foam, causing scorching and decomposition thereof. Although liquid blowing agents such as the halogenated hydrocarbons slightly reduce the viscosity of foam systems containing highly viscous polyether polyols the reduction is insufficient to allow the foaming machine to achieve the rapid homogeneity necessary for satisfactory foaming.

It is a primary object of the invention to provide a solution to the handling problem connected with the use of highly viscous polyether polyols in making polyurethane foam. Another object is to provide a method for preparing rigid polyurethane foam using highly viscous polyether polyols. These and other objects will become apparent from the following description.

It has now been found that the viscosity of highly viscous polyether polyols can be substantially reduced by blending therewith relatively small amounts of a low-molecular-weight glycol. The resulting polyol blend lends itself to easy handling without the use of special equipment, and it can be readily formulated into rigid polyurethane foam-forming reaction mixtures.

Surprisingly, the addition of the low-molecular-weight glycol does not adversely affect the rigidity of the resulting polyurethane foams as would be expected, since it is known to those skilled in the art that glycols enhance the formation of flexible foams and impair the structure of rigid foams. Furthermore, as can be seen from the examples below, the addition of low-molecular-weight glycols in some instances improves the properties of the polyurethane foams. Thus, for example, polyether polyols which generally provide poor foams having irregular cell structures now provide foams having uniform cell structures when blended with a low-molecular-weight glycol.

The highly viscous polyether polyols employed in the practice of this invention are known materials and are readily provided by the reaction of 1,2-epoxides with active hydrogen-containing polyols in the presence of an alkaline or acidic reaction catalyst. Among the 1,2-epoxides which are generally employed in the preparation of these materials are ethylene oxide, propylene oxide, the butylene oxides, styrene oxide, glycidol, N-hexyl oxide, cyclobutylene oxide, the polyhalogenated 1,2-epoxides such as 4,4,4-trichloro-1,2-epoxybutane, mixtures thereof and the like. It is particularly preferred to employ 4,4,4-trichloro-1,1-epoxybutane, alone or in addition to a halogen-free epoxide, in order to impart flame-retardant properties to the polyurethane foam.

Any active hydrogen-containing polyol can be reacted with one or more of the previously described 1,2-epoxides to provide the desired highly viscous polyether polyol. Exemplificative active hydrogen-containing polyols include:

(a) The polyhydroxyalkanes such as ethylene glycol, propylene glycol, 1,3-dihydroxypropane, 1,3-dihydroxybutane, 1,4-dihydroxyhexane, glycerol, 1,2,4-trihydroxybutane, 1,2,6-trihydroxyhexane, 1,1,1,-trimethylolethane, 1,1,1-trimethylolpropane, pentaerythritol, xylitol, arabitol, sorbitol, mannitol, and the like;

(b) Trialkanolamines such as triethanolamine, triisopropanolamine, tributanolamine, and the like, (c) Mono- and polyamines such as methylamine, ethylamine, isopropylamine, butylamine, benzylamine, aniline, ethylene diamine, diethylene triamine, triethylene tetramine, 1,3-butanediamine, 1,3-propanediamine, 1,4-butanediamine, and the like.

(d) The carbohydrates and their derivatives including (1) the monosaccharides, such as glucose (hydrous or anhydrous), mannose, galactose, allose, methyl glucoside, ethyl glucoside and the like, (2) the disaccharides such as sucrose, maltose, lactose and the like, (3) the polysaccharides such as starch, and (4) the reaction products of these mono, di, and polysaccharides with water or with a polyhydric alcohol, (e) Polyphenols such as bisphenol A, bisphenol F, condensation products of phenol and formaldehyde, the 1,1,3-tris(hydroxyphenyl) propanes, the 1,1,2,2-tetrakis (hydroxyphenyl)ethanes, and the like.

(f) Phosphorus-containing acids such as phosphoric acid, phosphorus acid, tripolyphosphoric acid, the polymetaphosphoric acids, and the like; and (g) The polytetramethylene glycols.

The preferred active hydrogen-containing polyols, however, are the carbohydrates and their derivatives. Particularly preferred are the glucose and sucrose derivatives which are obtained by heating, in the presence of an acid catalyst, glucose or sucrose with water or with a polyhydric alcohol. The latter can be any polyhydric alcohol containing at least two hydroxyl groups, such as ethylene glycol, glycerol, sorbitol, pentaerythritol, hexanetriol, trimethylol propane, trimethylol ethane, 1,2-butanediol, diethylene glycol, triethylene glycol, 2-butene-1,4-diol, 2-butyne-1,4-diol, 3-chloro-1,2-propanediol, 2-chloro-1,3-propanediol, mixtures thereof, and the like. Generally, it is preferred to use ethylene glycol, glycerol, or sorbitol due to their availability and ease of reaction.

In the preparation of active hydrogen-containing polyols by reacting sucrose or glucose with water or with a polyhydric alcohol, any convenient amount of water or polyhydric alcohol may be used. It is, preferred, however, to use, for every mole of sucrose or glucose, about ½ to about 5 moles of water or about ½ to about 10 moles of polyhydric alcohol. The reaction is carried out at a temperature ranging from about 25° C. to about 150° C. A typical acid catalyst used for the reaction is a Lewis acid which is used in a catalytic amount which may range, for example, from about 0.1 to about 10 parts per 100 parts by weight of sucrose or glucose. Illustrative Lewis acid catalysts are described below.

As noted earlier, the oxyalkylation reaction of the 1,2-epoxides with the active hydrogen-containing polyols is carried out in the presence of an acid or an alkaline catalyst. Any catalytic amount of such catalysts may be employed, such as from 0.1 to about 10 parts per 100 parts by weight of the active hydrogen-containing polyol. Alkaline catalysts, such as sodium hydroxide, sodium methylate and the like, are generally employed where halogen-free epoxides are used as the oxyalkylating agents. On the other hand, oxyalkylation with a halogenated epoxide such as 4,4,4-trichloro-1,2-epoxide generally requires an acid catalyst. This may be any inorganic, organic or Lewis acid. It is, however, preferred to use a Lewis acid such as boron trifluoride etherate, aluminum chloride, boron trichloride, antimony pentachloride, titanium chloride, tin tetrachloride, ferric chloride, and acidic clays such as Tonsil clay. The most preferred Lewis acid is boron trifluoride etherate.

The oxyalkylation reaction, employed to prepare the highly viscous polyether polyol, is generally carried out at a temperature between about 30° C. and about 200° C. until a polyether polyol having the desired hydroxyl number is obtained. While it is apparent to those skilled in the art that polyether polyols having viscosities lower than 215,000 cps. at 25° C. can be prepared from the above-described reactants, this invention relates only to those polyether polyols having viscosities above this limit, and particularly to those having a viscosity exceeding 225,000 cps. at 25° C. The structure of the active hydrogen-containing polyol, the structure of the 1,2-epoxide, and the degree of oxyalkylation are among the factors which determine the viscosity of the highly viscous polyether polyol. For example, 4,4,4-trichloro-1,2-epoxybutane, generally provides extremely viscous products when used to oxyalkylate the active hydrogen-containing polyols listed above. Further, where the polyol used is a carbohydrate derivative, the hydroxyl number and viscosity of the highly viscous polyether polyol will vary with the mole ratio of carbohydrate to epoxide; and although this mole ratio may vary over a wide range in the polyether polyols employed according to the invention, it is preferred to employ polyether polyols in which the mole ratio of carbohydrate to total epoxide is below about 1:3.

Among the low-molecular-weight glycols which may be blended with the highly viscous polyether polyol to reduce its viscosity in accordance with the teachings of the invention are ethylene glycol, propylene glycol, the butylene glycols, the dipropylene glycols, diethylene glycol, mixtures thereof and the like. It is preferred, however, to employ ethylene glycol or propylene glycol.

The concentration of glycol required to reduce the viscosity of the polyether polyol to below 215,000 cps. at 25° C. will vary according to the particular polyether polyol, its viscosity, the particular glycol and the desired viscosity of the resulting polyol blend. Generally, the polyether polyols used in this invention have viscosities ranging up to 3,000,000 cps. at 25° C. They are blended, according to the invention, with low-molecular-weight glycols in such proportions as to provide polyol blends having viscosities of less than 215,000 cps. at 25° C., and preferably not lower than 1000 cps.

Any convenient means, such as a reactor equipped with an agitator, may be used to blend the highly viscous polyether polyol with the low-molecular-weight glycol. Conveniently, the former is placed in the reactor first, and then, with the agitator turned on, the glycol is added; and agitation is thereafter continued until a homogeneous blend is obtained.

The polyurethane foams of this invention are prepared by reacting the glycol-containing polyol blend with an organic polyisocyanate in the presence of a foaming agent, a reaction catalyst, and preferably a silicone surfactant.

Any of the widely known organic polyisocyanates can be employed in the preparation of the polyurethane foams of this invention. An illustrative commercially available isocyanate is tolylene diisocyanate, which is a mixture of about 80 percent by weight of 2,4-tolylene diisocyanate and 20 percent by weight of the 2,6-isomer. Other typical isocyanates include, but are not limited to, the following: methylene-bis-(4-phenyl isocyanate), 3,3'-bitolylene-4,4'-diisocyanate, 3,3'-dimethoxy-4,4'-biphenylene diisocyanate, naphthalene-1,5-diisocyanate, hexamethylene diisocyanate, 1,4-phenylene diisocyanate, polyphenylene polymethylene isocyanate and the like. The amount of isocyanate employed in the preparation of the polyurethane foams should be sufficient to provide at least about 0.7 NCO group per hydroxyl group present in the reaction system. This includes the number of hydroxyl groups present in the glycol-containing polyol blend and the surfactant compounds of the present invention, the number of hydroxyl groups in any additives employed, and the number of hydroxyl groups employed in the foaming agent. An excess of isocyanate compound may be conveniently employed; however, this is generally undesirable due to the high cost of the isocyanate compound. It is preferable, therefore, to employ sufficient isocyanate to provide no greater than about 1.5 NCO groups per hydroxyl group, and preferably between about 0.9 and 1.1 NCO groups per hydroxyl group.

The polyurethane foams are prepared in the presence of a foaming agent, reaction catalyst, and preferably a small proportion of a conventional silicone surfactant. The foaming agent employed can be any of those known to be useful for this purpose, such as water, the halogenated hydrocarbons, and mixtures thereof. Typical halogenated hydrocarbons include, but are not limited to, the following: monofluorotrichloromethane, difluorodichloromethane, 1,1,2-trichloro-1,2,2-trifluoroethane, methylene chloride, chloroform, and carbon tetrachloride. The amount of foaming agent employed can be varied within a wide range. Generally, however, the halogenated hydrocarbons are employed in an amount from 1 to 50 parts by weight per 100 parts by weight of the polyether polyol of the present invention, and generally water is employed in an amount of from 0.1 to 10 parts by weight per 100 parts by weight of the polyether polyol.

The polyurethane foams are prepared in the presence of a catalytic amount of a reaction catalyst. The catalyst employed can be any of the catalysts known to be useful for this purpose, or mixture thereof, including tertiary amines and metallic salts. Typical tertiary amines include, but are not limited to, the following: N,N,N',N'-tetramethyl-butanediamine, N-methyl morpholine, N-hydroxyethyl morpholine, triethylene diamine, triethylamine and trimethylamine. Typical metallic salts include, for example, the salts of antimony, lead, tin and iron, e.g. dibutyltin dilaurate, stannous octoate, and the like. Generally speaking, the catalyst is employed in an amount ranging between about 0.05 and about 1.0, and preferably between about 0.075 and about 0.15 percent by weight of the polyether polyol.

It is preferred in the preparation of the polyurethane compounds of the present invention to employ minor amounts of a conventional polyurethane foam surfactant in order to further improve the cell structure of the polyurethane foam. Typical of such surfactants are the silicone oils and soaps. Generally up to 2 parts by weight of the surfactant is employed per 100 parts of the polyether polyol.

Various additives can be employed which serve to provide different properties, e.g. fillers such as clay, calcium sulfate, or ammonium phosphate may be added to lower cost and improve physical properties. Ingredients such as dyes may be added for color, and fibrous glass, asbestos, cotton, ramie or synthetic fibers may be added for strength. In addition, plasticizers, deodorants and antioxidants may be added.

These components are readily reacted in the customary "one-shot" manner to yield a polyurethane foam having excellent physical properties. However, if desired, the "prepolymer" technique, and "quasi" prepolymer technique may also be employed to prepare the novel foams of this invention.

The following examples are presented to illustrated the invention more fully without any intention of being limited thereby. All parts and percentages are by weight unless otherwise specified.

EXAMPLE 1

Boron trifluoride etherate (1.1 parts) and water (100 parts) were charged to a reactor containing 342 parts of sucrose. Heat was applied and the temperature of the mixture increased to 70° C. Ethylene oxide (110 parts) was added while maintaining a temperature of 50°–70° C. The volatiles, mainly water, were stripped at 75°–80° C. and 3 mm. of mercury pressure. Boron trifluoride etherate (2.3 parts) and 4,4,4-trichloro-1,2-epoxybutane (1147 parts) were added to the reaction mixture while maintaining a temperature of 80° C. The resulting polyether polyol had a hydroxyl number of 281 mg. KOH/gm. and a viscosity of greater than 2,000,000 cps. at 25° C.

The above polyether polyol was subdivided into 4 portions. To one 100 part portion was added 10 parts of ethylene glycol to provide a polyol blend having a hydroxyl number of 434 mg. KOH/gm. and a viscosity of 82,400 cps. at 25° C.

N,N,N',N'-tetramethylbutanediamine (2.0 parts), trichlorofluoromethane (3.2 parts) and siloxane oxyalkylene block copolymer surfactant[1] (2.0 parts) were added to 100 parts of the above-described ethylene glycol-containing polyol blend.

The mixture was stirred until homogenous and 110 parts of polyphenyl polymethylene isocyanate were added. After stirring, the mixture was poured into a rectangular box. Creaming of the mixture was observed after 11 seconds. After 74 seconds the foam reached its maximum rise; a tack time of 62 seconds was observed. The foam had excellent physical properties as set forth in Table I below.

EXAMPLE 2

A second 100 part portion of the polyether polyol described in Example 1 was mixed with 15 parts of ethylene glycol. The resulting polyol blend had a hydroxyl number of 510 mg. KOH/gm. and a viscosity of 17,100 cps. at 25° C.

Following the procedure of Example 1, a polyurethane foam was formulated employing 100 parts of the previously described siloxane oxyalkylene block copolymer surfactant, 2.0 parts N,N,N',N'-tetramethylbutanediamine, 34 parts trichloromonofluoromethane and 129 parts polyphenylene polymethylene isocyanate. A cream time of 19 seconds, a rise time of 70 seconds and a tack time of 64 seconds were observed. The properties of the foam are set forth in Table 1 below.

EXAMPLE 3

Ethylene glycol (20 parts) was mixed with a third 100 part portion of the polyether polyol described in Example 1. The resulting polyol blend had a hydroxyl number of 587 mg. KOH/gm. and a viscosity of 13,000 cps. at 25° C.

A polyurethane foam was prepared in accordance with the procedure described in Example 1 from 100 parts of the above-described ethylene glycol-containing polyol blend, 2.0 parts of the previously described siloxane oxyalkylene block copolymer surfactant, 2.0 parts of N,N,N',N'-tetramethylbutanediamine, 37 parts of trichloromonofluoromethane and 148 parts of polyphenylene polymethylene isocyanate. The cream time was 20 seconds, the rise time 95 seconds and the tack time 80 seconds. The physical properties of the foam are listed in Table I below.

COMPARATIVE TEST A

For purposes of comparison with the polyol blends used in Examples 1–3, a polyurethane foam was formulated employing 100 parts of the glycol-free polyether polyol described in Example 1, 1.5 parts of the previously described siloxane oxyalkylene block copolymer surfactant, 1.5 parts N,N,N',N'-tetramethylbutanediamine, 26 parts trichloromonofluoromethane and 71.5 parts polyphenylene polymethylene isocyanate. A cream time of 19 seconds, a rise time of 135 seconds and a tack time of 155 seconds were observed. The physical properties of the foam, listed in Table I below, reveal that foams prepared from the glycol-containing polyol blends described in Examples 1–3 possess properties comparable, and some instances better than the glycol-free polyether polyol.

EXAMPLE 4

Boron trifluoride etherate (1.1 parts) and water (100 parts) were charged to a reactor containing 342 parts of sucrose. Heat was applied and the temperature of the mixture increased to 70° C. Ethylene oxide (110 parts) was added while maintaining a temperature of 50° C.–70° C. The volatiles were stripped at 70° C. and 3 mm. of mercury pressure. The temperature was increased to 80° C. and additional boron trifluoride etherate (2.3 parts) and 583 parts of crude 4,4,4-trichloro-1,2-epoxybutane, containing about 25 percent high-boiling telomer impurities, was added while maintaining a temperature between 70°–80° C. The resulting polyether polyol had a hydroxyl number of 355 mg. KOH/gm., an

---

[1] This surfactant employed in all foam formulations has the following general formula:

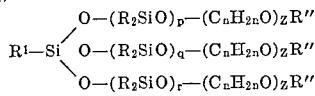

wherein R, R[1] and R'' are $C_{1-8}$ alkyl radicals; $p$, $q$ and $r$ are each 2 to 15 and $-(C_2H_{2n}O)_z-$ is a polyoxyalkylene block which is preferably a polyoxyethylene-polyoxypropylene block containing from 10 to 50 of each oxyalkylene unit.

acid number of 3.5 mg. KOH/gm. and a viscosity of 310,000 cps. at 29° C.

The polyether polyol was divided into 3 portions. To 100 parts of one portion was added 6.5 parts of ethylene glycol to provide a polyol blend having a hydroxyl number of 450 mg. KOH/gm. and a viscosity of 30,800 cps. at 29° C.

Following the procedure of the previous examples, a polyurethane foam was prepared from 100 parts of the above-described ethylene glycol-containing polyol blend, 2.0 parts of the previously described surfactant, 2.0 parts N,N,N',N'-tetramethylbutanediamine, 32 parts trichloromonofluoromethane and 114 parts polyphenylene polymethylene isocyanate. The cream time was 22 seconds, the rise time 70 seconds and the tack time 110 seconds. The physical properties of the foam are listed in Table I below.

EXAMPLE 5

Propylene glycol (8.4 parts) was mixed with a second portion (100 parts) of the polyether polyol described in Example 4 to provide a polyol blend having a hydroxyl number of 450 mg. KOH/gm. and a viscosity of 27,600 cps. at 29° C.

One hundred parts of the above-described propylene glycol-containing polyol blend, 2.0 parts of the previously described surfactant, 2.0 parts, N,N,N',N'-tetramethylbutanediamine, 32 parts trichloromonofluoromethane and 114 parts polyphenylene polymethylene isocyanate were employed to prepare a polyurethane foam following the procedure of the previous examples. A cream time of 18 seconds, a rise time of 120 seconds and a tack time of 120 seconds were observed. The physical properties of the foam are set forth in Table I below.

COMPARATIVE TEST B

For purposes of comparison with the polyol blends used in Examples 4 and 5, a polyurethane foam was prepared from 100 parts of the glycol-free polyether polyol described in Example 4, 2.0 parts siloxane oxyalkylene block copolymer surfactant, 2.5 parts N,N,N',N'-tetramethylbutanediamine, 31 parts trichloromonofluoromethane and 90 parts polyphenylene polymethylene isocyanate. The cream time was 11 seconds, the rise time 45 seconds and the tack time 40 seconds. The physical properties of this foam are listed in Table I below. From a comparison of these properties with those listed for the foams described in Examples 4 and 5, it is apparent that all three foams had comparable properties.

EXAMPLE 6

Following the procedure of Example 4, a polyether polyol was prepared by reacting a mixture comprising 424 parts of crude 4,4,4-trichloro-1,2-epoxybutane and 143 parts of propylene oxide with the oxyethylated sucrose initiator. The resulting polyether polyol had a hydroxyl number of 402 mg. KOH/gm., an acid number of 3.5 mg. KOH/gm. and a viscosity of 225,000 cps. at 25° C. This polyether polyol was divided into 3 portions, and 3.3 parts of ethylene glycol were added to 100 parts of one portion. The resulting polyol blend had a hydroxyl number of 450 mg. KOH/gm. and a viscosity of 47,200 cps. at 26° C.

Following the procedure of the previous examples, a polyurethane foam was prepared from 100 parts of the above-described ethylene glycol-containing polyol blend, 2.0 parts of the previously described surfactant, 2.0 parts N,N,N',N'-tetramethylbutanediamine, 32 parts trichloromonofluoromethane and 114 parts polyphenylene polymethylene isocyanate. A cream time of 15 seconds, a rise time of 60 seconds and a tack time of 50 seconds were observed. The physical properties of the foam are listed below in Table I.

EXAMPLE 7

To 100 parts of a second polyether polyol portion as described in Example 6 was added 4.4 parts of propylene glycol. The resulting polyol blend had a hydroxyl number of 450 mg. KOH/gm. and a viscosity of 60,000 cps. at 26° C.

One hundred parts of the above-described propylene glycol-containing polyol blend, 2.0 parts of the previously described surfactant, 2.5 parts N,N,N',N'-tetramethylbutanediamine, 32 parts trichloromonofluoromethane and 114 parts polyphenylene polymethylene isocyanate were employed to prepare a polyurethane foam as described in the previous examples. The observed cream time was 18 seconds, the rise time 110 seconds and the tack time 85 seconds. The physical properties are listed in Table I below.

COMPARATIVE TEST C

For purposes of comparison with the polyols used in Examples 6 and 7, a polyurethane foam was prepared from 100 parts of the glycol-free polyether polyol described in Example 6, 2.0 parts of the previously described surfactant, 2.0 parts N,N,N',N'-tetramethylbutanediamine, 31 parts trichloromonofluoromethane and 102 parts polyphenylene polymethylene isocyanate. A cream time of 20 seconds, a rise time of 110 seconds and a tack time of 115 seconds were observed. An irregular structure containing a multiplicity of voids precluded obtaining a representative sample of this foam. Accordingly, representative physical properties could not be determined, making the addition of glycols a necessary prerequisite to the procurement of satisfactory foams from this polyether polyol.

EXAMPLE 8

To a reactor containing 180 parts of glucose, there were added 68 parts of water, one part of boron trifluoride etherate, and 44 parts of ethylene oxide. The temperature of the reaction mixture was maintained at about 65° C. for about 30 minutes. The water was then stripped off at a temperature of 70–80° C. and a pressure of 5 mm. of mercury. While maintaining the reaction mixture within a temperature range of 75–85° C., two more parts of boron trifluoride etherate and 1108 parts of 4,4,4-trichloro-1,2-epoxy butane were added. The resulting polyether polyol had a hydroxyl number of 346 and a viscosity, at 25° C., of over 2,000,000 cps.

Seven parts of propylene glycol were blended with a 100 part portion of the above polyether polyol to reduce its viscosity to 212,000 cps. at 25° C. Then this polyol blend was used to prepare a polyurethane foam. To 100 parts of the blend, there were added 2.5 parts of tetramethyl butane diamine, 2 parts of siloxane oxyalkylene block copolymer, and 30 parts of trifluoromonochloromethane. The mixture was stirred until it was homogeneous, and then 95 parts of bis(p-isocyanatophenyl)methane [1] were added. The stirred mixture was poured into a rectangular box. Creaming was observed after about 11 seconds and the foaming was completed in about 65 seconds. The physical properties of the resulting rigid foam are set forth in Table I below.

COMPARATIVE TEST D

For purposes of comparison with the polyol blend used in Example 8, a second portion of the polyether polyol, prepared in Example 8, was used to prepare a polyurethane foam. Here 100 parts of glycol-free polyether polyol were used. To these, there were added 2.5 parts of tetramethyl butane diamine, 2.0 parts of siloxane oxyalkylene block copolymer surfactant, and 31 parts of trifluoromonochloromethane. The mixture was stirred until homogeneous, and then 88 parts of bis(p-isocyanatophenyl)

---

[1] Sold by Mobay under the trade name "Modur MR."

methane were added. The stirred mixture was poured into a rectangular box. Creaming was observed after 18 seconds and the foaming was completed after about 100 seconds. The physical properties of the resulting rigid foam, recorded in Table I, were found to be comparable to the properties of the foams of Examples 8 and 9.

TABLE I.—PHYSICAL DATA FOR FOAMS

| Example No. | Density, lbs./cu. ft. | Compressive strength, lbs./sq. in., parallel | Humid aging [1] 158° F., 100% R.H. after— | | |
|---|---|---|---|---|---|
| | | | 1 day | 2 days | 7 days |
| 1 | 2.04 | 43 | 8 | 10 | 10 |
| 2 | 1.90 | 37 | 5 | 6 | |
| 3 | 1.96 | 35 | 6 | 7 | |
| C T-A | 1.73 | 26 | 14 | 15 | 16 |
| 4 | 1.80 | 26 | 9 | 10 | 11 |
| 5 | 1.87 | 25 | 9 | 11 | 11 |
| C T-B | 1.85 | 32 | 6 | 6 | 7 |
| 6 | 1.84 | 28 | | 5 | 7 |
| 7 | 1.83 | 27 | 5 | 5 | 9 |
| 8 | 2.02 | 38 | 2.9 | 3.1 | 3.5 |
| C T-D | 1.83 | 32 | | 0.6 | 1.2 |

[1] This test was conducted as prescribed in ASTM D-2126-62T. The data represents percent change in volume after being maintained under the prescribed conditions for the specified number of days. The foams represented by Examples 2, 3 and 6 were not measured after 7.7 and 1 days respectively.

EXAMPLE 9

With a third 100 part portion of the polyether polyol prepared in Example 8, there were blended 10 parts of propylene glycol. As contrasted with Example 8 wherein 7 parts of propylene glycol were used to reduce the viscosity of the polyether polyol to 212,000 cps. at 25° C., the use of 10 parts of propylene glycol in this example reduced the viscosity of the polyether polyol to 179,000 cps. at 25° C. This polyol blend could also be used in making rigid polyurethane foam as illustrated in Example 8.

What is claimed is:

1. In a process for preparing a rigid polyurethane foam by reacting a highly viscous polyether polyol with an organic polyisocyanate in the presence of a foaming agent and a reaction catalyst, said polyether polyol having a viscosity exceeding 225,000 cps. at 25° C. and being the reaction product of (1) 4,4,4-trichloro-1,2-epoxybutane, or a blend thereof with a halogen-free 1,2-epoxide, and (2) a carbohydrate or a carbohydrate derivative, the improvement which comprises blending said polyether polyol with a glycol selected from the group consisting of ethylene glycol, propylene glycol, butylene glycol, diethylene glycol, and dipropylene glycol, in a proportion sufficient to form a polyol blend having a viscosity, at 25° C., below 215,000 cps.

2. The process of claim 2 wherein the carbohydrate used is sucrose or glucose.

3. The process of claim 2 wherein the carbohydrate derivative used is selected from the group consisting of
   (a) the reaction product of sucrose and water,
   (b) the reaction product of sucrose and a polyhydric alcohol,
   (c) the reaction product of glucose and water, and
   (d) the reaction product of glucose and a polyhydric alcohol.

4. The process of claim 3 wherein the glycol used is ethylene glycol or propylene glycol.

5. The process of claim 1 wherein the carbohydrate used is glucose.

6. The process of claim 5 wherein the carbohydrate derivative used is the reaction product of glucose and water or the reaction product of glucose and a polyhydric alcohol.

7. The process of claim 6 wherein the glycol used is ethylene glycol or propylene glycol.

8. The process of claim 7 wherein the carbohydrate derivative used is the reaction product of glucose and water.

9. A rigid polyurethane foam prepared by the process of claim 1.

10. A rigid polyurethane foam prepared by the process of claim 8.

References Cited

UNITED STATES PATENTS

| | | | |
|---|---|---|---|
| 3,405,077 | 10/1968 | Pastor | 260—2.5 AP |
| 3,386,927 | 6/1968 | Rosecrans | 260—2.5 BD |
| 3,359,217 | 12/1967 | Brandner | 260—2.5 AP |
| 3,269,961 | 8/1966 | Bruson | 260—2.5 AP |
| 3,252,943 | 5/1966 | Dankert | 260—77.5 AP |
| 3,222,357 | 12/1965 | Wismer | 260—2.5 AS |
| 3,219,598 | 11/1965 | Bressler | 260—2.5 AS |
| 3,149,083 | 9/1964 | Gmitter | 260—77.5 AP |
| 3,510,471 | 5/1970 | Case | 260—2.5 AS |

HOSEA E. TAYLOR, Primary Examiner

C. WARREN IVY, Assistant Examiner

U.S. Cl. X.R.

252—188.3; 260—2.5 AM